J. B. HAHN.
METHOD OF PRODUCING WALL AND FLOOR LININGS.
APPLICATION FILED AUG. 9, 1909.
1,048,528.
Patented Dec. 31, 1912.
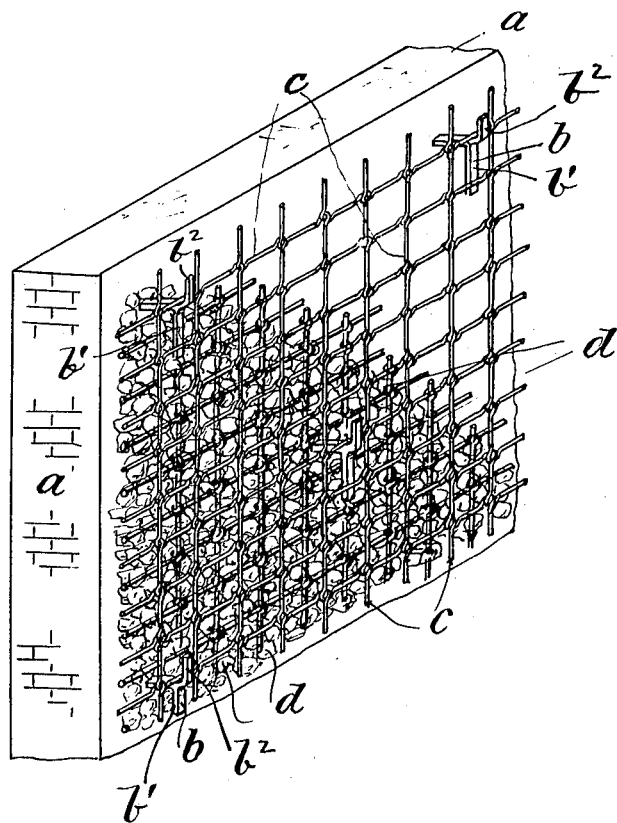
Witnesses:
M. H. Darg.
L. A. Price.
Inventor:
Jan Bronislav Hahn
by Wm. E. Boulter
his Attorney.

UNITED STATES PATENT OFFICE.

JAN BRONISLAV HAHN, OF VIENNA, AUSTRIA-HUNGARY, ASSIGNOR OF ONE-HALF TO RUDOLF KMUNKE, OF VIENNA, AUSTRIA-HUNGARY.

METHOD OF PRODUCING WALL AND FLOOR LININGS.

1,048,528.  Specification of Letters Patent.  Patented Dec. 31, 1912.

Application filed August 9, 1909. Serial No. 512,278.

*To all whom it may concern:*

Be it known that I, JAN B. HAHN, a citizen of the Empire of Austria-Hungary, residing at Vienna, in Austria-Hungary, have invented a certain new and useful Method of Producing Wall and Floor Linings, of which the following is a full, clear, and exact description.

This invention relates to a method of producing wall and floor linings from glass and has more particularly for its object the production of vessels the inner walls of which should have a single jointless lining.

The method consists in filling the space formed between a rough masonry wall and a net or trellis-work suspended at a distance therefrom with glass especially glass chips, broken glass and the like, and this filling is then subjected to the action of a plow-pipe flame whereby the pieces of glass melt and become incrusted and thereby form a very effective jointless connection with one another and the wire netting and also wholly or partly become fused with the rough masonry so that the whole forms a single completely watertight structure. The treatment is completed by blowing glass powder on the part acted on at any moment by the blow-pipe flame and this not only assists the melting and the incrustation of the pieces of glass but also completely fills the spaces between the latter and also essentially assists in the formation of a jointless surface. Moreover, by this means the protecting net hung in front is coated over with a durable jointing layer of glass so that such materials as acids which attack metal and do not attack glass can be introduced into a receptacle so constructed and coated. This treatment may be recommended both on account of its simplicity and on account of the great resistance of glass to various influences, for the manufacture of collectors, (for example, for water, wine, raw oil, acids, sugar cane juice and the like) these are constructed with rough masonry walls and then coated according to this method with a single layer of glass; such vessels form a good, quickly manufactured and cheap substitute for reservoirs produced from metal, concrete, etc.

In the accompanying drawing which illustrates one wall of a receptacle constructed in accordance with this process, $a$ is the masonry work on the inside of which by means of suitable supporting hooks $b$ the net $c$ is supported. The space between the wall $a$ and the net $c$ is filled with pieces of glass $d$ and through the net a blow-pipe flame is introduced, glass powder or glass dust being blown on the part acted on by the flame. These supporting hooks have each a downwardly and an upwardly directed arm $b^1$, $b^2$ arranged close behind one another of which the one lies behind and the other in front of the carrying net $c$ so that the latter can neither be pressed against the wall $a$ nor drawn away from the same.

The method is such that the pieces of glass with similar amounts of glass powder or glass dust are mixed with raw oil, massuth or other similar combustible material to form a kind of cement, the latter being introduced into the space between the rough masonry and the supporting net and thereupon the whole subjected to the action of a blow-pipe flame. In this case the blowing on of glass dust may be dispensed with. In this case also instead of a blow-pipe flame being allowed to act on the material after the introduction of the material, the raw oil or massuth used as a binding material between the pieces of glass and the glass powder may be first ignited and allowed to burn, the layer thus preheated and partly melted being then subjected to the action of a blow-pipe flame. This has the advantage that it prevents the cracking of the stones of the wall which might take place owing to the sudden effect of the blow-pipe flame and the overheating of the glass dust. The glazing over of the protecting net is effected uniformly by this means.

The size and the form of the vessel to be treated is immaterial so far as the method is concerned; the latter may be used not only for the production of inside linings of reservoirs, baths, hospitals, urinals, cooling chambers, and work rooms especially those used for the manufacture of food stuffs and the like but also for the production of vitreous coating on any outer surface.

What I claim is:—

1. The herein described method which consists in arranging a metallic network over the surface to be coated with an intervening space between the two, then filling the space between the network and the said surface with a filling of pieces of glass mixed with a combustible binding material then subjecting the said filling to the action of a blow-pipe flame, and blowing glass powder onto the filling and network during the action of the blow-pipe flame.

2. The herein described method which consists in arranging a metallic network over the surface to be coated with an intervening space between the two, then filling the space between the network and the said surface with a filling of pieces of glass mixed with glass powder and a combustible binding material, then igniting the binding material to cause the partial melting of the filling material, and then subjecting the filling to the action of a blow-pipe flame to complete the melting as and for the purpose set forth.

JAN BRONISLAV HAHN.

Witnesses:
WILHELM BERGER,
AUGUST FUGGER.